Figure 1:
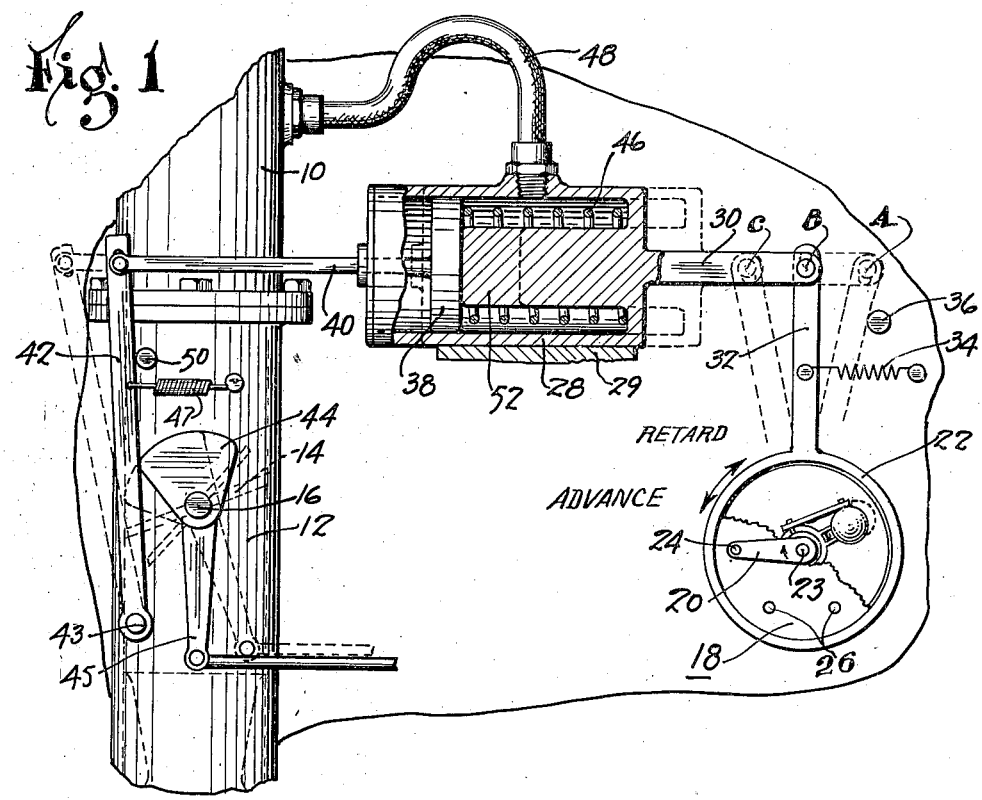

Feb. 22, 1938.    D. COLE    2,109,103

IGNITION TIMING CONTROL

Filed Sept. 10, 1934

INVENTOR.
Don Cole
BY P. R. McCrady,
ATTORNEY.

Patented Feb. 22, 1938

2,109,103

UNITED STATES PATENT OFFICE 2,109,103

IGNITION TIMING CONTROL

Don Cole, Evanston, Ill., assignor to Bendix Products Corporation, South Bend, Ind., a corporation of Indiana Application September 10, 1934, Serial No. 743,375

10 Claims. (Cl. 123—117)

This invention relates to means for controlling the ignition of internal combustion engines, and more particularly to a method of and means for automatically regulating the time of firing the spark in the combustion chamber of the engine in accordance with variables such as manifold vacuum, throttle opening, and speed of the engine.

It is known that the combustible mixture, in the cylinder of an internal combustion engine does not explode instantaneously, but that an interval of time is required for the entire charge to become ignited. This time lag depends upon the rate of flame propagation, which is a variable dependent upon the density of the charge and the pressure to which the charge is subjected, as well as other factors. The rate of flame propagation becomes more rapid as the density of the charge increases, and also more rapid as the pressure of the charge is increased.

To secure maximum efficiency from the engine and also to obtain the greatest amount of power from a given quantity of fuel it is necessary that the spark which ignites the charge should occur before the piston reaches the top dead center position. The degree of advance should be sufficient to permit the entire charge to become fully ignited shortly after the instant when the piston reaches the top dead center position, on the compression stroke. In this manner the force of the expanding gases will be exerted upon the face of the piston in the most effective manner. The degree of spark advance to secure best results is thus necessarily dependent upon the rate of flame propagation.

If the spark occurs too early the charge will be fully ignited before the piston reaches the top of its stroke and the expanding gases will resist the movement of the piston, resulting in loss of power and rough running. If the spark occurs too late the full force of the expanding gases will not be exerted upon the piston at the beginning of the power stroke and a decreased efficiency will result.

Since the time required for the propagation of the flame in a charge of a given density remains practically constant, it follows that as the engine is speeded up the degree of spark advance, measured in degrees, must be increased if the full power of the expanding gases is to be exerted upon the piston at the beginning of the power stroke. In present-day automobiles, this is commonly done automatically by a speed-responsive mechanism known as the automatic spark advance.

The power developed by the engine is a function of the density of the charge admitted and also of the speed of the engine. Thus with an increase in the charge admitted to the cylinders the engine may carry a greater load at the same speed or the same load at a higher speed. Likewise, reducing the charge necessitates a reduction in the load if the same speed is to be maintained, or the same load may be carried at a reduced speed.

To obtain the greatest efficiency from the engine it is necessary to vary the time of igniting the charge so that the maximum power will be exerted upon the piston near the beginning of the power stroke. The rate of flame propagation must therefore be taken into account, and since this depends primarily upon the density of the charge it is necessary to make suitable adjustments for throttle setting, which is one of the factors determining the density of the charge.

According to a preferred embodiment of this invention I have therefore provided a novel connection between the throttle valve actuating mechanism and the ignition timing system whereby the spark is advanced as the throttle valve is moved toward the open position.

When the engine is running at idling speed or comparatively slowly with the throttle valve closed or nearly closed the pumping action of the cylinders exerted on the carburetor will result in a high vacuum in the intake manifold. If now the throttle is opened, either to increase the speed of the engine or to enable the engine to carry an increased load at the same speed, a greater charge of air and fuel vapor will be supplied to each cylinder per intake stroke and the negative pressure or vacuum existing in the intake manifold will be destroyed. Under such conditions, it is necessary to retard the spark to prevent backfiring or pounding which would be detrimental to the engine.

One of the important objects of this invention is the provision of novel means whereby the spark is automatically retarded when the negative pressure or vacuum in the induction passage posterior to the throttle valve is destroyed.

Another object of this invention is to so control the ignition of the charge in the combustion chambers that the maximum power is obtained from the fuel.

Having these and other objects in mind, one embodiment of the invention comprises a novel connecting linkage between the throttle valve and the ignition system of an internal combustion engine. In the embodiment shown, the spark is advanced as the throttle valve moves from closed to partially open position and is retarded as the throttle valve is moved from a partially open to a still greater open position.

In the illustrative accompanying drawing this linkage is shown as a floating cylinder operably connected with the timer of the ignition system, with a piston therein operably connected with the throttle valve. The cylinder is yieldingly urged in one direction by a spring and is adapted to be urged in the other direction by suction transmitted to the cylinder through a duct communicating with the intake manifold of the engine.

A further object of this invention is to produce an automatic ignition regulating system of the type described which is simple in operation and which can be manufactured very inexpensively.

Other objects and advantages of the present invention will be more apparent from the following detailed description and from the illustrative embodiments of the invention in the accompanying drawing which are intended merely for illustrative purposes and are not intended to define the scope of the invention, reference being had for that purpose to the subjoined claims.

Figure 2:
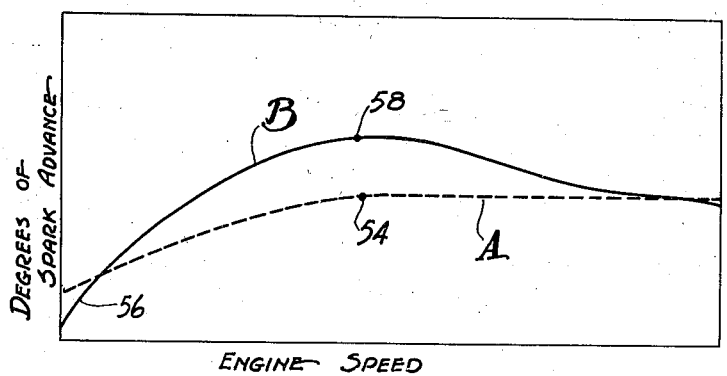

In the drawing:

Figure 1 is a diagrammatic view showing an apparatus embodying the invention; and Figure 2 is a chart showing the relation of engine speed to spark advance in an engine equipped with the apparatus of the present invention.

Referring to the embodiment of the invention disclosed in Figure 1 there is shown diagrammatically a portion of an internal combustion engine equipped with a manifold riser 10 connected with a carbureting passage 12. A throttle valve 14 is mounted on a throttle shaft 16 journalled in the walls of the caburetinng passage 12.

A conventional ignition timing unit is shown at 18 and comprises the usual rotatable arm 20 driven by a system of gears connected with the cam shaft of the engine and provided with a contact point 24 which successively contacts with the relatively stationary contacts 26 set in the base member 22. Any suitable type of automatic spark advance such as the one illustrated may be employed, whereby the arm 20 is rotated relative to its shaft 23 in accordance with engine speed.

In the present invention, the spark, in addition to being advanced and retarded by the automatic spark advance, is advanced and retarded by rotating the base member 22 in a manner now to be described. A floating cylinder 28 is slidably mounted upon any suitable support 29 and is operatively connected with the base member 22 by means of a rod 30 and an arm 32 which is fixed to the base member 22 and yieldingly urged toward the retarded position by a spring 34 which holds the arm 32 against a stop member 36 under certain operating conditions.

A piston 38 within the cylinder 28 is operably connected with the throttle valve 14 through a rod 40 which is pivoted to the free end of a lever 42 the other end being pivoted to a fixed point 43 on the carburetor. The lever 42 is operated by means of a cam 44 fixed to the throttle shaft 16 and actuated in consonance with throttle movements by means of the usual throttle lever 45. The cam 44 is so proportioned that it moves the lever 42 rapidly when the throttle valve 16 starts to open, so that the full extent of travel is imparted to the lever 42 by the time the throttle valve 14 is about one-fourth open, after which no further movement is imparted to the lever. A spring 47 connected to the lever 42 holds the edge of the lever in contact with the surface of the cam 44.

The piston 38 is yieldingly urged toward one end of the cylinder 28 by a spring 46, and the cylinder 28 is subjected to the subatmospheric pressure or vacuum existing in the manifold riser 10 by means of a flexible duct 48 communicating therewith. The effect of the vacuum in the cylinder 28 is to draw the cylinder to the left relative to the piston 38, such movement being limited by a stop 52 carried by the cylinder.

The operation of the device, when the engine is running at idling speed, is as follows. The throttle valve 14 will be closed and the lever 42 will be in engagement with a stop member 50, so that the piston 38 will be in the extreme right hand position (as shown). A comparatively high suction will exist in the manifold riser 10 and will be transmitted to the cylinder 28 through the duct 48, holding the cylinder 28 to the left, maintaining the stop member 52 against the piston 38 by compressing the spring 46, and rotating the arm 32 in the counterclockwise direction from its extreme left-hand position, indicated at A in Figure 1, to the position indicated at B, thereby advancing the spark.

The operation when the throttle is approximately one-fourth open is as follows. The cam 44 has rotated the lever 42 in the counterclockwise direction about the pivot 43 to the position indicated in dotted lines in Figure 1, moving piston 38 to the left by means of the rod 40 connected with the lever 42. The partial vacuum existing in the manifold riser 10 is transmitted to the cylinder 28 by the duct 48 and moves the cylinder 28 to the left, rotating the arm 32 in the counterclockwise direction to the position indicated at C in Figure 1. The spark is then fully advanced.

The operation when the throttle is wide open is as follows. The vacuum in the manifold riser is substantially at atmospheric, and the spring 46 has moved the cylinder 28 to the right, thereby rotating the arm 32 in the clockwise direction to retard the spark to the position indicated at B in Figure 1.

It will be noted that when the engine is not running and the throttle valve 14 is closed, the arm 32 is at the position indicated at A in Figure 1, wherein it abuts the stop member 36. The spark is then fully retarded, which is desirable when the engine is to be cranked. As soon as the engine has started and is operating at idling speed with the throttle valve 14 closed, the vacuum in the manifold riser 10 will urge the cylinder 28 to the left, advancing the spark to the position B to give satisfactory operation of the engine at idling speed. When the throttle valve is progressively opened and the engine is speeded up, the spark is automatically advanced to the position represented at C. As the engine is forced to carry an increased load, the spark is automatically retarded back to the position B to prevent the engine from knocking.

In Figure 2, the curve A shows the relation between the time of ignition and the speed of the engine where only the conventional spark advance device is employed. In this curve it will be noted that the spark is advanced as the speed of the engine is increased until a certain point, represented by the numeral 54, is reached. From this point an increase in speed of the engine will not effect any change in the degree of spark advance.

The curve B represents the variation in the spark advance where the instant invention is employed as above described. It will be noted that when the engine is being operated at extremely low speeds, such as would be produced in cranking, the spark is retarded more than in the conventional device, as is indicated at 56 on curve B. As the speed of the engine is increased, the spark advances rapidly until a maximum point 58 is reached, from which point the spark is retarded slowly as the vacuum in the manifold drops due to the opening of the throttle valve beyond a predetermined point or approximately one-fourth full open position and at high speeds the curve B will meet the curve A.

The instant invention thus provides a greater effective range of operation, together with greater flexibility and efficiency than can be obtained by the conventional devices.

While a preferred embodiment of this invention has been shown and described in detail, it is not my intention to limit the scope of the invention to the arrangement shown nor otherwise than by the terms of the appended claims.

I claim:

1. An internal combustion engine having an ignition system including a distributor, a carburetor having a throttle valve, a source of suction posterior to said throttle valve, means connecting said distributor and carburetor and comprising a cylinder operably connected with said distributor, a piston slidably mounted within the cylinder, yielding means urging the cylinder toward one extreme position, connecting means between the cylinder and the source of suction, and connecting means including a throttle actuated cam between said piston and said throttle valve.

2. An internal combustion engine having an ignition system including a distributor having two members movable relative to each other to advance and retard the spark, a carburetor having a throttle valve, a source of suction posterior to said throttle valve, means connecting said distributor and carburetor and comprising a cylinder operably connected with one of said members, a piston slidably mounted within the cylinder, yielding means urging the piston toward one extreme position, connecting means between the cylinder and the source of suction, connecting means between said piston and said throttle valve, and yielding means urging said cylinder toward one extreme position.

3. An internal combustion engine having an ignition system including a distributor having two members movable relative to each other to advance and retard the spark, a carburetor having a throttle valve, a source of suction posterior to said throttle valve, means connecting said distributor and carburetor and comprising a cylinder operably connected with one of said members, a piston slidably mounted within the cylinder, connecting means between the cylinder and the source of suction, connecting means between the piston and the throttle valve, and yielding means urging the cylinder toward one extreme position, said connecting means being operable to regulate the time of ignition in accordance with the speed of the engine and pressure existing in the source of suction.

4. In an ignition control system for an internal combustion engine having a carburetor forming a source of suction and equipped with a throttle valve, an ignition system including a plurality of relatively movable members operable to advance and retard the time of ignition, means including a floating cylinder and a piston operably connected to the throttle valve to control one of said relatively movable members, and connecting means between the source of suction and the cylinder.

5. An ignition control system for an internal combustion engine having a carburetor forming a source of suction and equipped with a throttle valve, an ignition system including a plurality of relatively movable members operable to advance and retard the time of ignition, means including a floating cylinder operably connected to one of said relatively movable members and a piston slidably mounted in the floating cylinder operably connected to the throttle valve to advance and retard the time of ignition, yielding means urging the cylinder in the direction to retard the time of ignition, and connecting means between the source of suction and the cylinder.

6. An internal combustion engine having a carburetor including a source of differential fluid pressure and a throttle valve, an ignition system including a distributor to advance and retard the spark, centrifugally actuated means to advance and retard the spark, auxiliary means including a floating cylinder operably connected to the distributor and a piston operably connected to the throttle valve and slidable in the cylinder to advance and retard the spark, and connecting means between the source of suction and the cylinder.

7. In an internal combustion engine a carburetor including a source of differential fluid pressure and a throttle valve, a cam fixed to the throttle valve, an ignition system including a distributor to advance and retard the spark, means including a floating cylinder operably connected to the distributor and a piston slidable in the cylinder and operated by said cam to advance and retard the spark, connecting means between the source of suction and the cylinder, and yielding means urging the cylinder to one extreme position to retard the spark.

8. In an ignition control system for an internal combustion engine having a carburetor forming a source of suction and equipped with a throttle valve, a cam fixed to the throttle valve, an ignition system including a plurality of relatively movable members operable to advance and retard the time of ignition, means including a floating cylinder operably connected to one of said relatively movable members and a piston slidably mounted in the floating cylinder and associated with the throttle valve and actuated by said cam to advance and retard the time of ignition, yielding means urging the cylinder in the direction to retard the time of ignition, and connecting means between the source of suction and the cylinder.

9. An internal combustion engine having an ignition system, a carbureting system, a throttle valve controlling the carburetor, a member movable in accordance with throttle position, a source of suction associated with the carburetion system, and means including a movable cylinder and a piston operably connected to said member and controlled jointly by throttle position and suction interconnecting the ignition and carbureting systems for automatically advancing the time of ignition as the engine is speeded up and retarding the ignition as the pressure in said source of suction rises to atmospheric.

10. In an internal combustion engine, an ignition system including a control member movable to advance and retard the spark, a carburetor comprising a throttle, a member movable in accordance with movements of the throttle, and a connection between said movable member and said control member comprising a movable cylinder and piston the relative positions of which are variable in accordance with the degree of suction posterior to the throttle.

DON COLE.